UNITED STATES PATENT OFFICE.

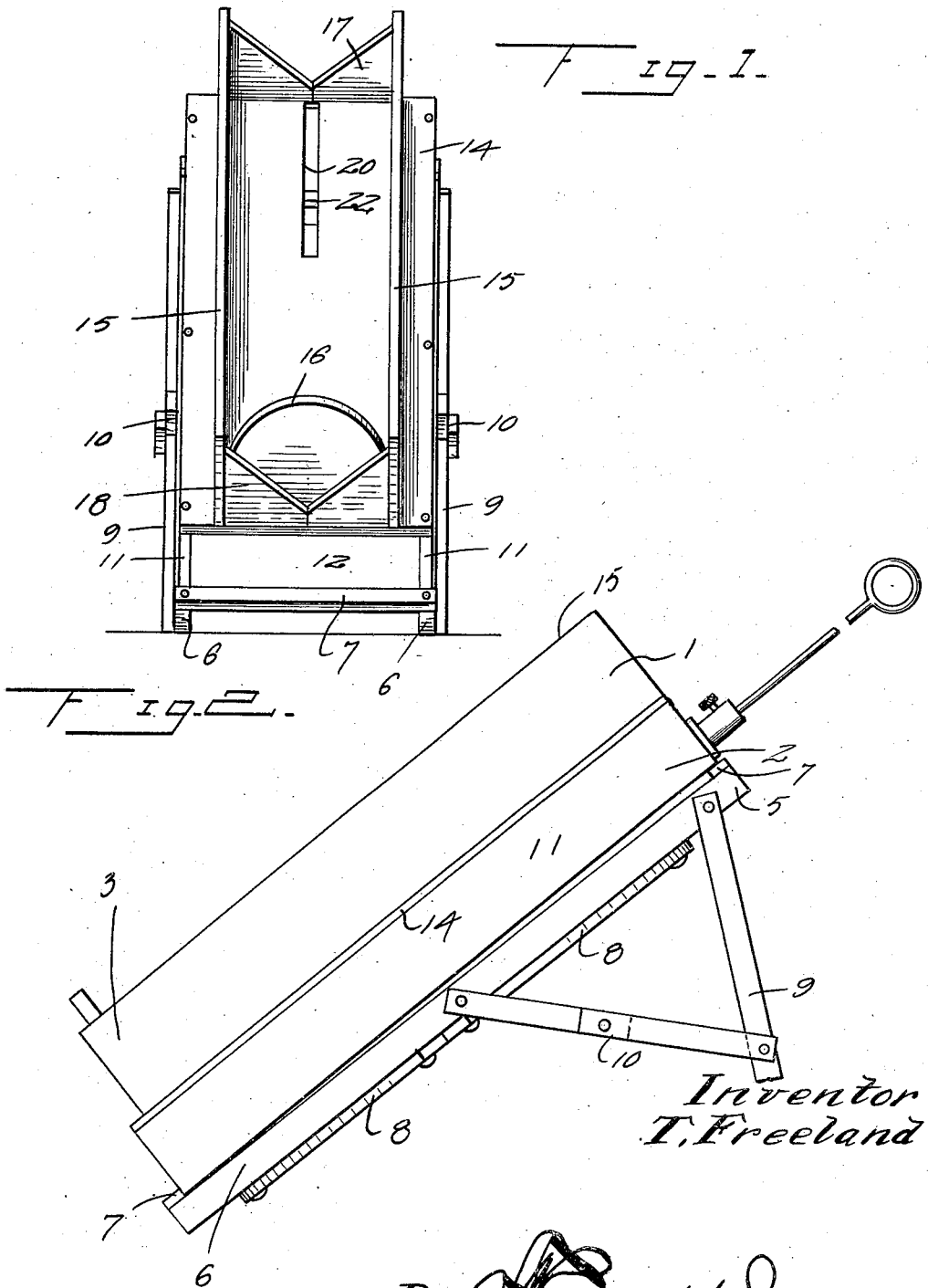

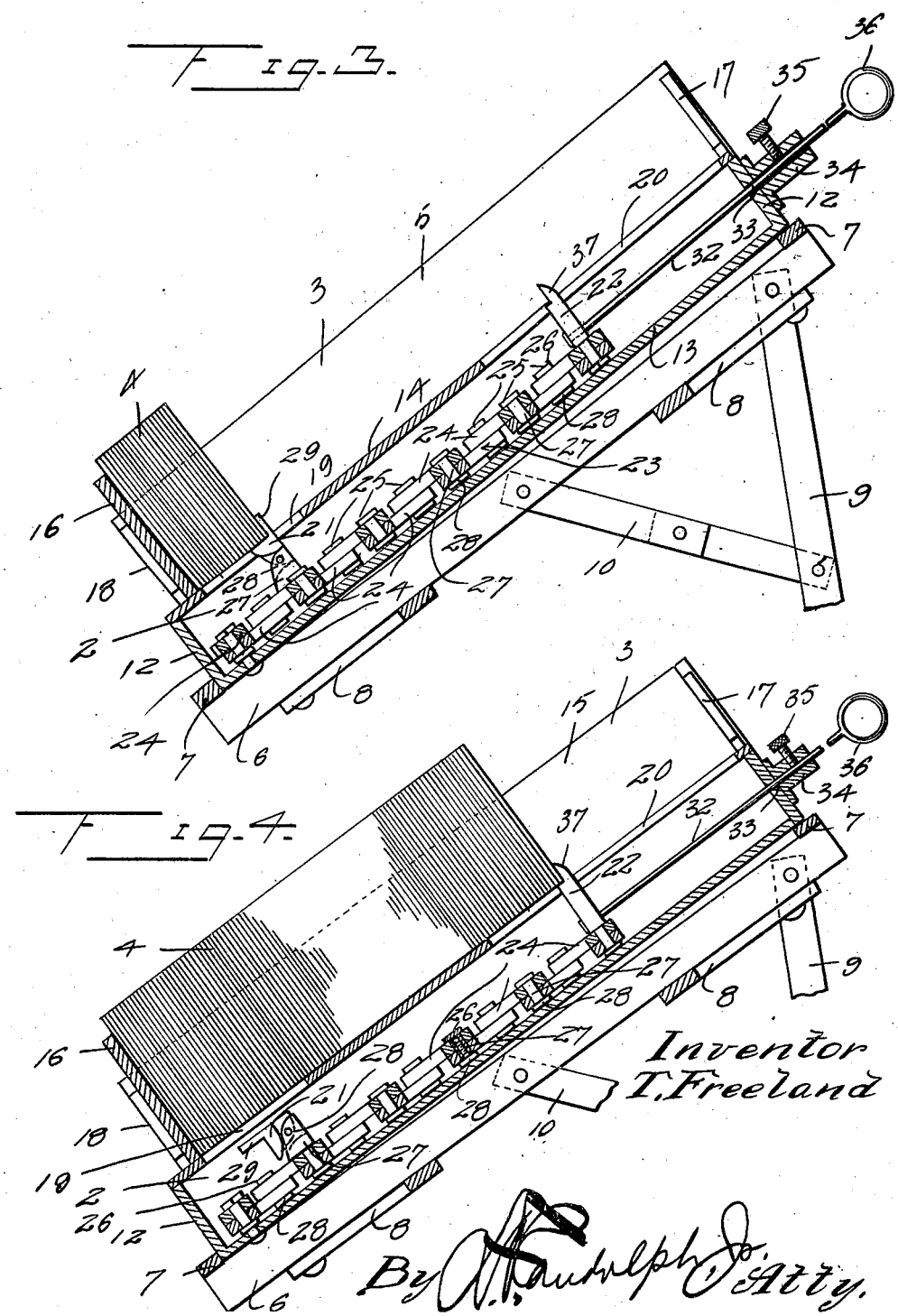

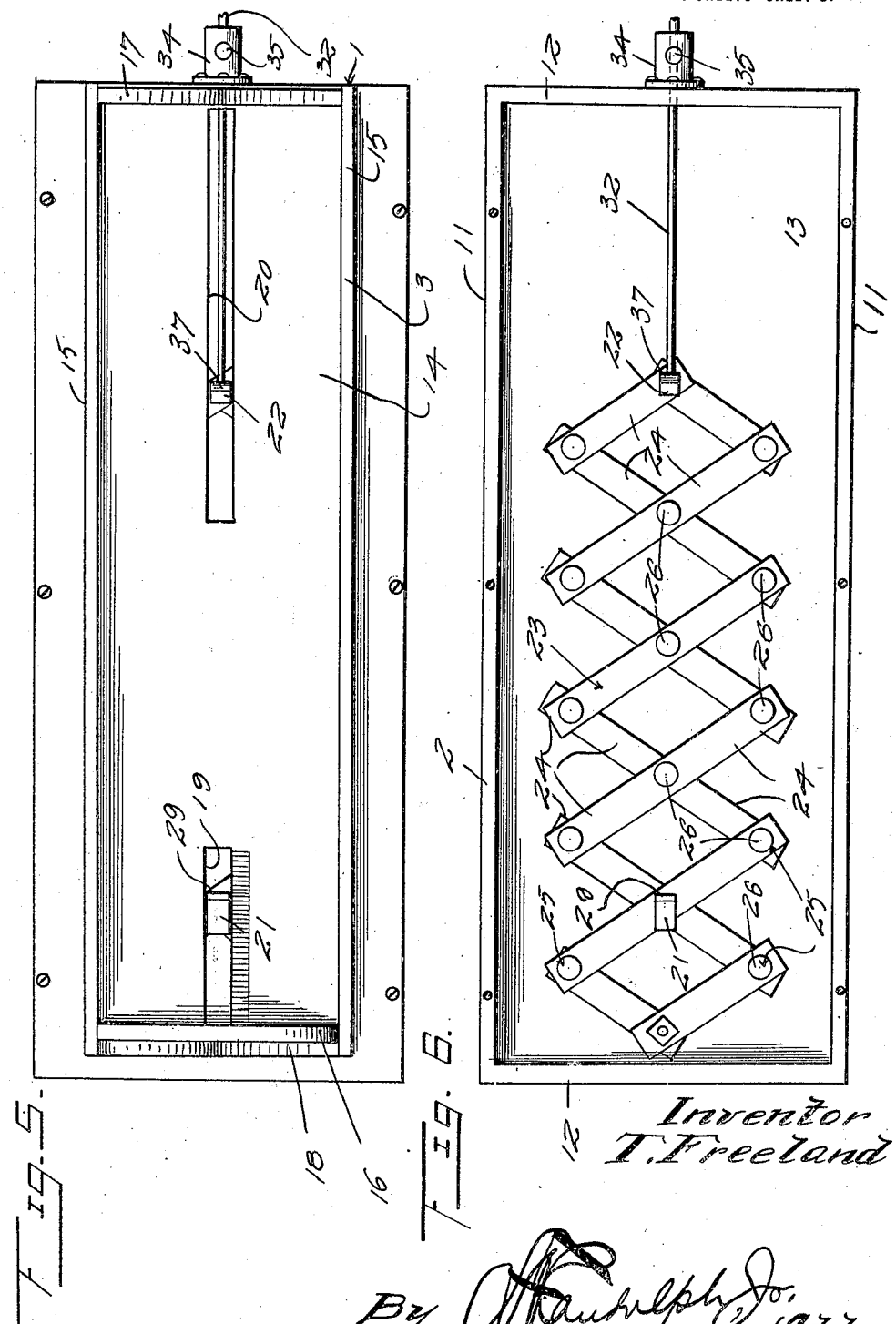

THOMAS FREELAND, OF INDIANAPOLIS, INDIANA.

COUNTER.

1,359,884.  Specification of Letters Patent.  Patented Nov. 23, 1920.

Application filed October 10, 1919. Serial No. 329,877.

*To all whom it may concern:*

Be it known that I, THOMAS FREELAND, a citizen of the United States, residing at Indianapolis, in the county of Marion and State of Indiana, have invented certain new and useful Improvements in Counters; and I do hereby declare the following to be a full, clear, and exact description of the invention, such as will enable others skilled in the art to which it appertains to make and use the same.

This invention relates to counters and the primary object of the invention is to provide an improved means for counting can tops and bottoms and the like, so as to eliminate the method now employed in factories manufacturing can tops and bottoms of weighing the can tops and bottoms.

Another object of the invention is to provide an improved can top and bottom counter, which is so constructed as to effectively count the can tops and bottoms by measure and embodies a trough or receptacle for receiving the can tops or bottoms having a movable and adjustable gage adapted to engage a predetermined number of the can tops or bottoms and lock them in the adjusted position, said gage being operably connected with a marker or pointer, which is adapted to measure exactly five times the number of hand tops or bottoms originally counted.

A further object of the invention is to provide an improved can top and bottom counter of the above character in which the necessity of resetting the gage is obviated as long as the can top and bottom are of the same uniform thickness.

A still further object of the invention is to provide a can top and bottom counter of the above character which includes a scale arranged adjacent to the gage, so that the exact thickness of the can tops or bottoms can be readily seen, and so that if the thickness of the can tops and bottoms changes, the gage can be reset.

A still further object of the invention is to provide an improved device of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, and claimed and illustrated in the accompanying drawings, forming a part of the application in which:

Figure 1 is a front elevation of the improved device,

Fig. 2 is a side elevation of the improved device,

Fig. 3 is a vertical longitudinal section of the same showing the gage in set position and in engagement with the predetermined amount of can tops or bottoms, Fig. 4 is a similar view, showing the gage thrown into operative position and the device measuring five times the amount of tops or bottoms as originally counted.

Fig. 5 is a top plan view of the device showing the top removed,

Fig. 6 is a plan view of the improved device showing the can top receiving trough removed.

Referring to the drawings in detail wherein similar reference characters designate corresponding parts throughout the several views, the numeral 1 generally indicates the improved device, which includes a casing 2 having a trough 3 secured to the upper surface thereof for the reception of disks or other members 4 to be counted. The device 1 is adapted to be supported in an inclined position, as clearly shown in Fig. 2 of the drawings and a frame 5 is provided for this purpose.

The frame 5 includes a pair of inclined longitudinally extending side bars 6 secured together at their upper and lower ends by transversely extending cleats 7 which are adapted to engage the upper and lower edges of the device 1 to hold the same against downward movement. The longitudinally extending bars 6 are further held against movement in relation to each other by diagonally extending brace bars 8, which are secured to the lower surface thereof. The rear ends of the longitudinally extending bars 6 have pivotally secured thereto supporting legs 9. The legs 9 are adapted to be held in their open positions by means of pivotally connected links 10 which have their outer terminals pivotally secured respectively to the side bars 6 and legs 9.

The casing 2 of the device 1 includes side walls 11, end walls 12, the bottom wall 13, and a top wall 14. The top wall forms a support for the bottom wall for the trough 3, which extends longitudinally of the casing from the upper edge thereof to the lower edge thereof and includes the side walls 15 and the end walls 16 and 17. The lower end wall 16 is held in place by suitable angle braces 18 which extend inwardly from the side walls 16, the upper end wall 17 is so shaped as to permit the ready positioning and removal of the disk 4 from the trough which is so shaped as to conform to the configuration of the disk. The top wall 14 is provided with a pair of longitudinally extending slots 19 and 20, which extend inwardly from the lower and upper edges of the device respectively and the same are adapted to receive the gage 21 and the pointer 22 respectively, the objects of which will be hereinafter more fully described.

The casing 2 has mounted therein the measuring member 23 which is of lazy tongs construction and includes five sections formed from a plurality of pivoted arms 24, connected together by pivot bolts 25, each of which includes a head 26 having internally threaded cylindrical bodies 27 which extend through the arm and an externally threaded shank 28 which is fitted into the shell. The outer terminals of the lowermost arms are pivotally connected to the bottom wall 13 adjacent the lower end thereof.

The lowermost section carries the gage 21, which includes a shank 26 connected to the upstanding stud 27 by means of a pivot joint 28'. This connection permits the gage 21 to be thrown downward in the slot 19 when the same is not in use. The outer terminal of the shank 26 is provided with an upstanding ear 29 which is adapted to engage the outer face of a disk being counted when the gage is in operative position and the same extends through the slot 19. The free terminals of the arms 24 of the upper-most section carry the pointer 22 which is formed integrally with a head 31 rigidly connected to the outwardly extending operating rod 32 which is slidably extended through an opening 33 formed in the upper end wall 12. A sleeve 34 surrounds said opening and forms a guide for the rod and carries a thumb screw 35 which is adapted to engage the rod 32 to hold the same in any preferred adjusted position. The outer end of the operating rod is provided with a hand grip 36 whereby the same may be readily actuated. The lower end of the head 31 carries a reduced pivot bolt by means of which the free terminals of the arms of the outer section are pivotally connected together. The end of the pivot bolt receives an ordinary nut, which holds the same in position. The upper end of the pointer carries a foot 37, which extends through the slot 20 and the same has its upper end sharpened for a purpose which will hereinafter more fully appear.

In operation of the improved device, if the bottoms or tops are to be counted in piles of one hundred, twenty of the bottoms or tops are counted and placed in the chute. The handle 36 is grasped and the operating rod moved inwardly until the foot 29 of the gage comes into engagement with the outer surface of the lids. The set screw is then tightened, so as to engage the rod and prevent movement thereof. A number of bottoms and tops are then picked out and placed into the chute until the same come into engagement with the foot 37 formed on the pointer 22. The number of plates lying between the bottom wall and pointer will be found to be exactly one hundred, and the same can then be removed and other plates placed in the chute and stacked up to the pointer. In this way the can tops and bottoms may be readily and quickly counted and handled. Owing to the sharpened surface of the foot 37, when the can tops and bottoms are being placed in position, the same will readily separate the can tops and bottoms and deflect the same on each side thereof.

Owing to the fact that the thickness of the tin from which the tops are made sometimes varies, it is necessary to adjust the gage longitudinally toward or away from the wall 16 when a variation in the thickness of the tin is detected.

The upper wall 14 of the casing is graduated adjacent to one wall of the slot 19 or at 38, so that as the can tops and bottoms are placed in position in the trough the thickness thereof will be readily seen.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. An article counter including a base upon which the articles to be counted are arranged one against the other, elements to be set at points longitudinally of the base so that a predetermined number of articles at one side of one of the elements, and a number of articles occupying the space between said elements and through the other element will total given number of articles.

2. A can top counter mechanism of the class described comprising a casing, a chute arranged on the casing adapted to receive the can tops and bottoms, means for holding the casing at an incline to the horizontal, a gage slidably mounted in the chute and arranged to engage a predetermined number of the can tops or bottoms, means to lock the gage in adjusted position, and a pointer operatively connected with the gage so that a certain number of tops can be positioned a certain distance from the lower wall of the chute and the gage, as and for the purpose specified.

3. A counting device for can tops and bottoms comprising a casing, a chute arranged on the casing and adapted to receive the tops or bottoms to be counted, a measuring member arranged in the casing of lazy-tong construction, and including a plurality of sections, a gage carried by the first section, a pointer carried by the last section, the chute having slots formed therein arranged to receive said gage and pointer, as and for the purpose specified.

4. A counting mechanism for can tops and bottoms comprising a casing, a trough mounted on the upper wall of the casing and extending longitudinally of the same adapted to receive the can tops and bottoms, a measuring device slidably mounted in the casing of lazy-tong construction, including a plurality of sections, means pivotally securing the lower end of the lazy-tong construction to the casing, an operaing rod secured to the outer end of the lazy-tong construction, a guide for said rod, means for locking the rod against movement, a gage carried by the first section, a pointer carried by the last section, as and for the purpose specified.

5. The combination with a base upon which articles to be counted are placed one against the other, of a gage to be arranged at a point on the base to indicate a predetermined number of articles, and an indicator to be set at a point with respect to the gage to permit such a number of articles to be arranged between the gage and indicator as to total with the predetermined number of articles, a given number.

6. In a mechanism for counting relatively flat articles, a receptacle in which the articles are to be placed edgewise and one against the other, a gage to be set at a distance from one end of the receptacle to receive a predetermined number of articles between said end of the receptacle and the gage, and an indicator positioned at such a distance from the gage as to receive a predetermined number of articles between the gage and indicator.

7. A counting mechanism including a receptacle in which the articles are to be placed in contacting relation, a pivoted link unit having one end fixed, an operating handle carried by the opposite end thereof, a gage carried by said unit, and an indicator also carried by the unit, the linked unit being adapted to be adjusted longitudinally to dispose the gage and indicator at such points as to permit given numbers of articles to be positioned between one end of the receptacle and gage and the gage and indicator respectively.

In testimony whereof I affix my signature in presence of two witnesses.

THOMAS FREELAND.

Witnesses:
 OTHO H. DENTON,
 JAMES A. JOHNSON.